United States Patent [19]

White et al.

[11] Patent Number: 4,987,316
[45] Date of Patent: Jan. 22, 1991

[54] PASSENGER RESTRAINT FIRING CIRCUIT

[75] Inventors: Craig W. White, Grosse Pointe; Kevin E. Musser, Farmington, both of Mich.

[73] Assignee: Automotive Systems Laboratory, Inc., Farmington Hills, Mich.

[21] Appl. No.: 414,668

[22] Filed: Oct. 3, 1989

[51] Int. Cl.$^5$ .............................................. B60R 21/16
[52] U.S. Cl. .................... 307/10.1; 340/436; 280/735
[58] Field of Search ............... 307/9.1, 10.1, 66, 121; 340/436–438, 441, 669, 652; 280/735; 180/268, 271, 274, 281, 282

[56] References Cited

U.S. PATENT DOCUMENTS

| | | | |
|---|---|---|---|
| 3,871,472 | 3/1975 | Hosaka et al. | 280/735 |
| 4,222,030 | 9/1980 | Yasui et al. | 280/735 |
| 4,851,705 | 7/1989 | Musser et al. | 307/10.1 |

Primary Examiner—A. D. Pellinen
Assistant Examiner—David Osborn
Attorney, Agent, or Firm—Lyon & Delevie

[57] ABSTRACT

A firing circuit for deploying a pair of air bags comprises four circuit legs connected in parallel across a voltage supply via a diode shunted with a resistor. The first and second circuit legs each comprise in series a safing sensor, a squib, and a crash sensor, with each sensor being shunted by a like resistor whose resistance is substantially greater than the nominal resistance of the squibs. The third and fourth circuit legs each preferably comprise a resistor in series with a capacitor, with the resistance of the series resistor being significantly greater than that of the resistor shunting the grounded diode. Five bridges interconnect the four circuit legs so as to provide multiple firing paths and continued circuit viability notwithstanding the presence of one or more "faults" in the instant firing circuit. The addition, for example, of voltage detecting and comparing means about the four circuit legs, diodes and/or current-limiting devices in the bridges between the circuit legs further, and means operative to draw current from a junction on the first and second circuit legs, respectively, renders the instant firing circuit fully diagnosable in situ.

21 Claims, 4 Drawing Sheets

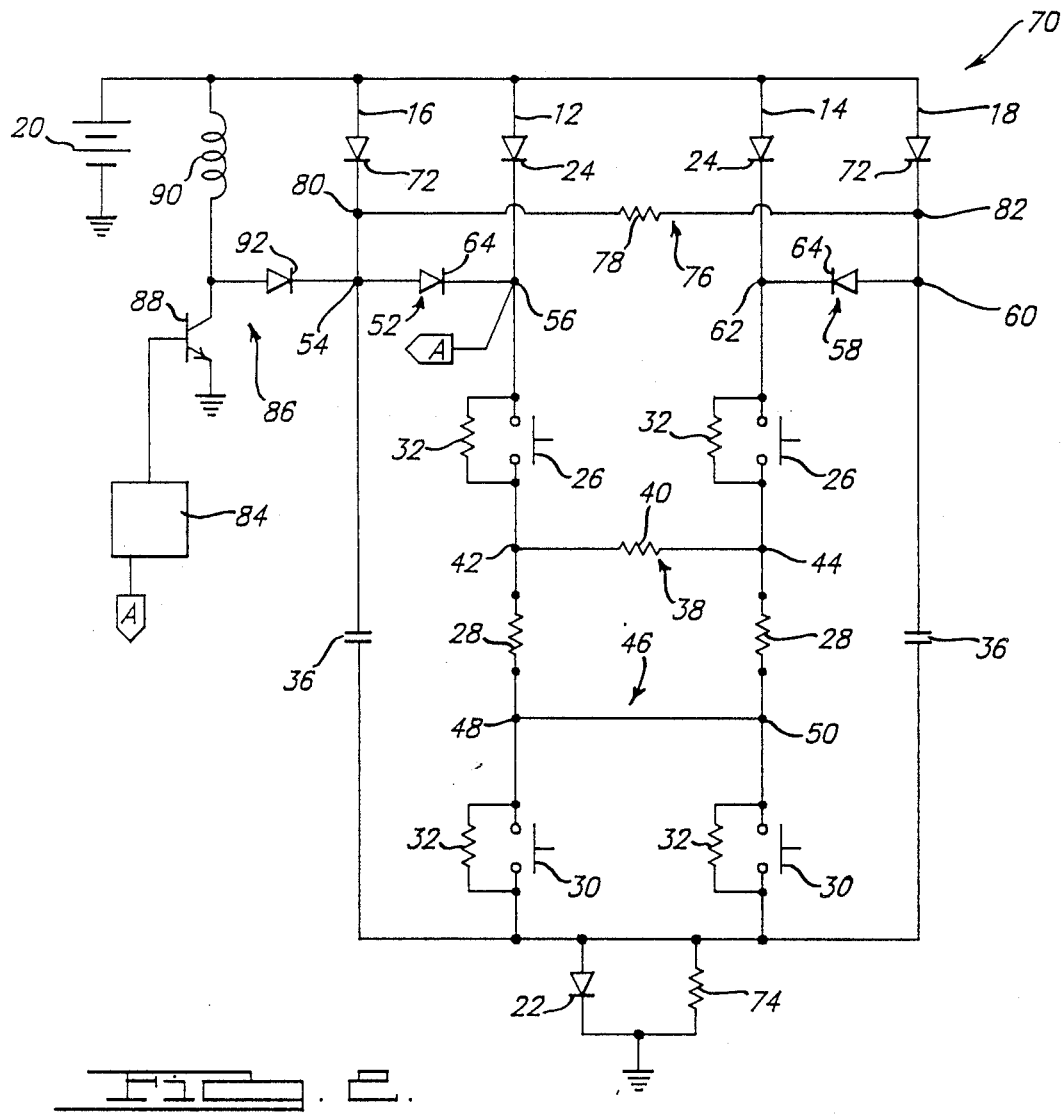
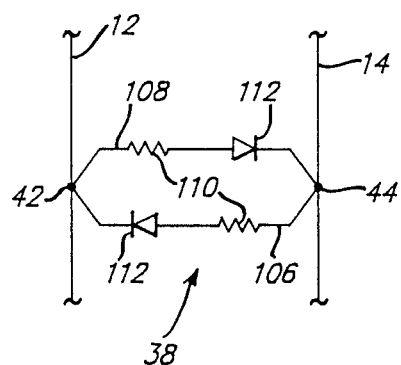

4,987,316

PASSENGER RESTRAINT FIRING CIRCUIT

BACKGROUND OF THE INVENTION

The instant invention relates to vehicle passenger restraint systems and, more specifically, to a firing circuit for an air bag passive restraint system which can be readily diagnosed for the presence of faults therein.

Known air bag passenger restraint systems comprise a firing circuit having a voltage supply providing a potential across a firing squib in series with a first and second normally-open vehicle acceleration sensor, each of which is shunted by a resistor of like nominal resistance. A small current thus flows through the circuit while the sensors remain in the normally-open condition. The closure of the sensors upon collision or marked deceleration of the vehicle generates a significant rise in the current flowing through the squib which, in turn, fires the squib to deploy the air bag.

In U.S. Pat. No. 4,851,705 issued July 25, 1989, we teach a firing circuit for a passenger restraint system featuring redundant "crash" and "safing" sensors and full fault diagnosability, and its teachings are hereby incorporated herein by reference. Specifically, the '705 patent teaches a firing circuit wherein the simultaneous closure of either of two crash sensors and either of two safing sensors will fire one or more squibs to deploy a passenger restraint such as an air bag. The marketplace has since demanded a redundant, diagnosable firing circuit for a passenger restraint system which remains viable, i.e., capable of actuating the restraint controlled therewith, notwithstanding the presence of one or more faults therein.

SUMMARY OF THE INVENTION

It is an object of the instant invention to provide a firing circuit for a vehicle passenger restraint featuring multiple firing paths and continued circuit viability notwithstanding the presence of one or more faults therein.

It is also an object of the instant invention to provide a fully diagnosable firing circuit for a passenger restraint featuring multiple firing paths and continued circuit viability notwithstanding the presence of one or more faults therein.

In its most basic form, the instant firing circuit for actuating a first and second vehicle passenger restraint, such as a pair of air bags, comprises four parallel circuit legs connected across a battery via a diode placed in series therewith, whereby the cathode of the diode is grounded to the battery. The first and second circuit legs each comprise in series a diode, a normally-open safing sensor connected to the cathode of the diode, a trigger means such as a squib having an internal resistance for deploying an air bags, and a normally-open crash sensor. Each sensor of the first and second circuit legs is shunted by a resistor having a nominal resistance substantially greater than the internal resistance of each squib. The third and fourth circuit legs each comprise in series a current-limiting device from the group consisting of resistors and diodes, and a capacitor. It is noted that, of these two current-limiting devices, the resistor is preferred over the diode inasmuch as a resistor may further serve to isolate the capacitor connected therewith from the positive terminal of the battery; in contrast, when a diode is employed as the current-limiting device, either the diode or the capacitor in series therewith would blow in the event of a short to the capacitor.

The four parallel circuit legs are further interconnected by a plurality of bridges extending therebetween, as follows: a first bridge including a current-limiting device such as a resistor connects a first junction on the first circuit leg between its safing sensor and squib with a first junction on the second circuit leg between its safing sensor and squib. Another suitable, albeit more expensive current-limiting device for use in the first bridge is a pair of n-channel MOSFETs connected in series so as to place their sources in opposition and having their gates tied to their respective drains A second bridge connects a second junction on the first circuit leg between its squib and crash sensor with a second junction on the second circuit leg between the squib and crash sensor thereof In its most basic form, the second bridge of the instant firing circuit merely comprises a short between the first and second circuit legs at the second junctions thereof.

A third bridge connects a first junction on the third circuit leg between the current-limiting device and the capacitor thereof with a third junction on the first circuit leg between its diode and safing sensor; similarly, a fourth bridge connects a first junction on the fourth circuit leg between its current-limiting device and capacitor with a third junction on the second circuit leg between the diode and safing sensor thereof. The third and fourth bridges each comprise a diode with its cathode facing the first and second circuit legs, respectively.

The first and second bridges provide multiple firing paths for the squibs, whereby both squibs are fired and, hence, both air bags are deployed, upon simultaneous closure of either safing sensor and either crash sensor. These multiple firing paths combine with the partially isolated capacitors to provide continued circuit viability notwithstanding the presence of one or more faults therein. The third and fourth bridges in combination with the capacitors of the third and fourth legs ensure that sufficient voltage to fire both of the squibs will remain available notwithstanding the one or more faults associated, for example, with the shorting of either capacitor. The third and fourth bridges further serve to isolate the capacitors from each other in the event that one of the capacitors is shorted Where greater circuit viability is desired, the instant firing circuit further comprises a resistor shunting the grounded diode; a fifth bridge connecting the third and fourth circuit legs at junctions thereon between the current-limiting resistor/diode and the capacitor thereof, respectively; means for detecting the voltage applied at a junction on at least one of the parallel circuit legs; and at least one charge pump responsive to voltage detecting means operative to trickle-charge the capacitors of the third and fourth circuit legs. For example, the charge pump may comprise a transistor whose collector is connected both to the positive terminal of the battery by an inductor and to the junction on the third or fourth circuit leg by a diode, the cathode of which face the first and second circuit leg; and whose emitter is grounded.

Specifically, the shunting resistor provides a current path to facilitate the charging of the capacitors by preventing the grounded diode from switching "on" and "off" when the capacitor is "pumped". The fifth bridge operates in conjunction with the charge pump and the third and fourth bridges to ensure that sufficient voltage is available to fire the squibs notwithstanding, for example, the shorting of either capacitor. Significantly, the fifth bridge includes a resistor, the resistance of which must be carefully chosen in a manner known to one skilled in the art so as to permit but one charge pump to sufficiently charge both capacitors while maintaining some measure of independence between the third and fourth legs so as to capitalize on the redundancy offered thereby In order to achieve full circuit diagnosability, the basic firing circuit described hereinabove further comprises a pair of oppositely-biased diodes on each of the first and second bridges, respectively. With regard to the addition of the diodes to the current-limiting device on the first bridge, it is noted that, since the junction of a MOSFET itself constitutes a low-power diode, where a pair of opposed n-channel MOSFETs are used to limit the flow of current through the first bridge, no additional diodes are required on that bridge. The diagnosable firing circuit of the instant invention preferably also comprises means for determining the instantaneous forward-biased conduction voltages of the bridge diodes, such as means operative to draw current from at least one bridge-circuit leg junction about the firing circuit and means for calculating the resultant voltage drop across each bridge, whereby the firing circuit periodically redetermines the forward-biased conduction voltage of the diodes so as to account for original manufacturing tolerances as well as the effects of time and temperature thereon.

The bridges of the diagnosable firing circuit perform all of the functions previously described with respect to the basic circuit. The bridges additionally permit the diagnosing of the presence of one or more firing circuit "faults" in situ, as well as facilitating the identification of the faults. To that end, the diagnosable circuit further comprises means for reading the voltages at a plurality of the junctions thereabout and the voltage applied across each of the circuit legs; means for calculating a plurality of voltage ranges from the applied voltage and a like number of known percentages of the applied voltage, and means for comparing the voltage at one of the junctions with the thus calculated voltage ranges; means for comparing the voltages detected at two or more junctions with each other or with ground; and means for comparing the voltage drop across each of the bridges with the forward-biased conduction voltages of the diodes thereof.

Finally, the diagnosable circuit preferably further comprises signal means for signalling the presence of one or more faults, and means for recording each fault upon the diagnosis thereof.

BRIEF DESCRIPTION OF THE DRAWINGS

In the drawings, wherein like reference numerals are employed to designate identical components among the various embodiments:

FIG. 2 is a diagrammatic schematic of a second embodiment of an air bag firing circuit featuring continued circuit viability and additional power supply redundancy but still lacking diagnostic capability.

FIG. 6 is a isolated schematic of an alternate configuration for the current-limiting bridge connecting the first junctions of the first and second circuit legs (the "first bridge") which includes oppositely-biased diodes to permit full circuit diagnosability.

DETAILED DESCRIPTION OF THE PREFERRED EMBODIMENTS OF THE INVENTION

Figure 1:
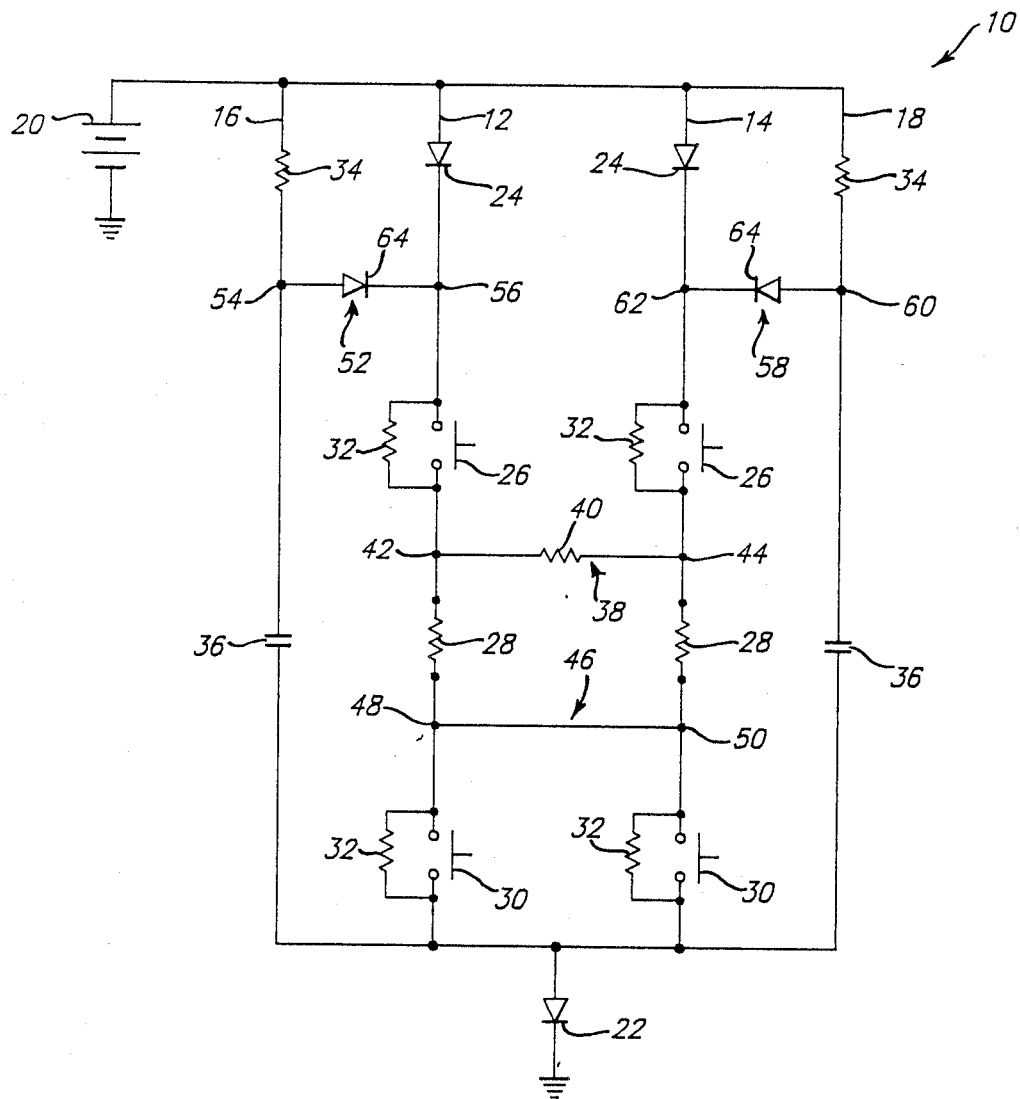
FIG. 1 is a diagrammatic schematic of a first embodiment of an air bag firing circuit constructed in accordance with the instant invention featuring continued viability notwithstanding the presence of one or more faults therein but lacking diagnostic capability.

Referring to FIG. 1, a first embodiment 10 of the firing circuit of the instant invention for deploying a pair of air bags (not shown) comprises four circuit legs 12, 14, 16, and 18 connected in parallel across a battery 20 via a diode 22 connected in series therewith so as to ground the cathode thereof. Specifically, the first and second circuit legs 12 and 14 each comprise in series a diode 24; a normally-open "safing" sensor 26 connected to the cathode of the diode 24; an explosive squib 28 for triggering deployment of the first air bag when the current flowing therethrough exceeds a threshold value; and a normally-open "crash" sensor 30.

The acceleration threshold of the crash sensors 30 is significantly greater than the acceleration threshold of the safing sensors 26, whereby the former are effectively "armed" by the latter. Additionally, each sensor 26 and 28 is shunted by a resistor 32 having a nominal resistance substantially greater than the internal resistance of each squib 28. Significantly, the nominal resistance of the shunting resistors 32 is preferably several orders of magnitude larger than the nominal internal resistance of the squibs 28. For example, where the nominal internal resistance of the squibs 28 is about 2 ohms, the shunting resistors 32 preferably comprise 2k$\Omega$ resistors.

The third and fourth circuit legs 16 and 18 each comprise a resistor 34 connected in series with a capacitor 36. The resistor 34 of the third and fourth circuit legs 16 and 18, respectively, acts to limit current flow therethrough.

The four parallel circuit legs are further interconnected by a plurality of bridges extending therebetween, as follows: a first bridge 38 including a current-limiting device such as a resistor 40 connects a first junction 42 on the first circuit leg 12 between its safing sensor 26 and squib 28 with a first junction 44 on the second circuit leg 14 between its safing sensor 26 and squib 28.

A second bridge 46 connects a second junction 48 on the first circuit leg 12 between its squib 28 and crash sensor 30 with a second junction 50 on the second circuit leg 14 between its squib 28 and crash sensor 30. In this regard it is noted that, in the first embodiment shown in FIG. 1, the second bridge 46 merely comprises a short between the first and second circuit legs 12 and 14 at the second junctions 48 and 50 thereof.

A third bridge 52 connects a first junction 54 on the third circuit leg 16 between the current-limiting resistor 34 and the capacitor 36 thereof with a third junction 56 on the first circuit leg 12 between its diode 24 and safing sensor 26; similarly, a fourth bridge 58 connects a first junction 60 on the fourth circuit leg 18 between its current-limiting resistor 34 and capacitor 36 with a third junction 62 on the second circuit leg 14 between the diode 24 and safing sensor 26 thereof. The third and fourth bridges 52 and 58 each comprise a diode 64 with its cathode facing the first and second circuit legs 12 and 14, respectively.

The first and second bridges 38 and 46 provide multiple firing paths for the squibs 28 of the instant firing circuit 10, whereby both squibs 28 are fired and, hence, both air bags are deployed, upon simultaneous closure of either safing sensor 26 and either crash sensor 30. These multiple firing paths combine with the partially isolated capacitors to provide continued circuit viability notwithstanding the presence of one or more faults therein. The third and fourth bridges 52 and 58 in combination with the capacitors 36 of the third and fourth legs 16 and 18, respectively, ensure that sufficient voltage to fire both of the squibs 28 will remain available notwithstanding the one or more faults associated, for example, with the shorting of either capacitor 36. The third and fourth bridges 52 and 58 further serve to isolate the capacitors 36 from each other in the event that one of the capacitors 36 is shorted.

The second embodiment 70 of the instant firing circuit is shown in FIG. 2. It is initially noted that the current-limiting resistor 34 in the third and fourth circuit legs 16 and 18 of the first embodiment 10 has been replaced by a diode 72 to illustrate its potential for use therein. However, as noted hereinabove, as between these two current-limiting devices, the resistor 34 of the first embodiment 10 is preferred over the diode 72 of the second embodiment 70 inasmuch as the resistor 34 remains viable as a current path as it serves to isolate the capacitor 36 connected therewith from the positive terminal of the battery 18; in contrast, in the second embodiment 70, in the event that the capacitor 36 is shorted to ground, either the diode 72 or the shorted capacitor 36 will "blow".

In addition to the circuit elements heretofore described with respect to the first embodiment shown in FIG. 1, the second embodiment 70 further comprises a resistor 74 shunting the grounded diode 22; a fifth bridge 76 including a resistor 78 which connects the third and fourth circuit legs 16 and 18 at junctions 80 and 82 thereon between the diode 72 and capacitor 36 thereof, respectively; a microprocessor 84 having an analog-to-digital converter port "A" thereon for detecting the voltage $V_A$ applied across circuit leg 12 at junction 56 thereof; and a charge pump 86 controlled by the microprocessor 84 operative to trickle-charge the capacitors 36 of the third and fourth circuit legs 16 and 18. It is noted that the reference voltage $V_A$ may alternatively be read from junction 62 of circuit leg 14.

The charge pump 86 specifically comprises a transistor 88 having its collector connected to the positive terminal of the battery 20 via an inductor 90. The collector of the transistor 88 is also connected to the third circuit leg 16 between the diode 72 and capacitor 36 thereof by another diode 92. The emitter of the pumping transistor 88 is grounded, i.e., connected to the negative terminal of the battery 20. In this regard, it is noted that the capacitor 36 is normally charged by the battery 20 connected thereacross, whereby the voltage delivered across the circuit legs 12, 14, 16, and 18 remains sufficient to deploy the air bags in the event that the battery 20 malfunctions or is otherwise isolated from the firing circuit 70 during a vehicle collision. The input to the charging transistor 88 comprises the pulsed output of the microprocessor 84 which continuously monitors the voltage $V_A$ applied across one of the circuit legs 12 or 14 at junctions 56 or 62 thereof. The diode 92 of the charge pump 86 prevents the premature discharge of the capacitor 36.

The resistor 74 shunting the grounded diode 22 provides a current path to facilitate the charging of the capacitors 36 by preventing the grounded diode 22 from switching "on" and "off". The fifth bridge 76 operates in conjunction with the charge pump 86 and the third and fourth bridges 52 and 58 to ensure that sufficient voltage is available to fire the squibs 28 notwithstanding, for example, a battery malfunction or the isolation of the battery 20 from the parallel legs 12, 14, 16, and 18 of the firing circuit 70. Significantly, the resistance of the resistor 78 of the fifth bridge 76 must be carefully chosen relative to the resistance of the series resistor 34 of the third and fourth circuit legs 16 and 18 in a manner known to one skilled in the art so as to permit the single charge pump 86 to sufficiently charge both capacitors 36 while maintaining some measure of independence between the third and fourth legs 16 and 18 so as to capitalize on the redundancy offered thereby. For example, in a constructed embodiment of the firing circuit 100 of FIG. 3, the series resistor 34 of each of the third and fourth circuit legs 16 and 18 has a nominal resistance of 10kΩ, and the shunting resistor 74 has a nominal resistance of 500 ohms.

Figure 3:
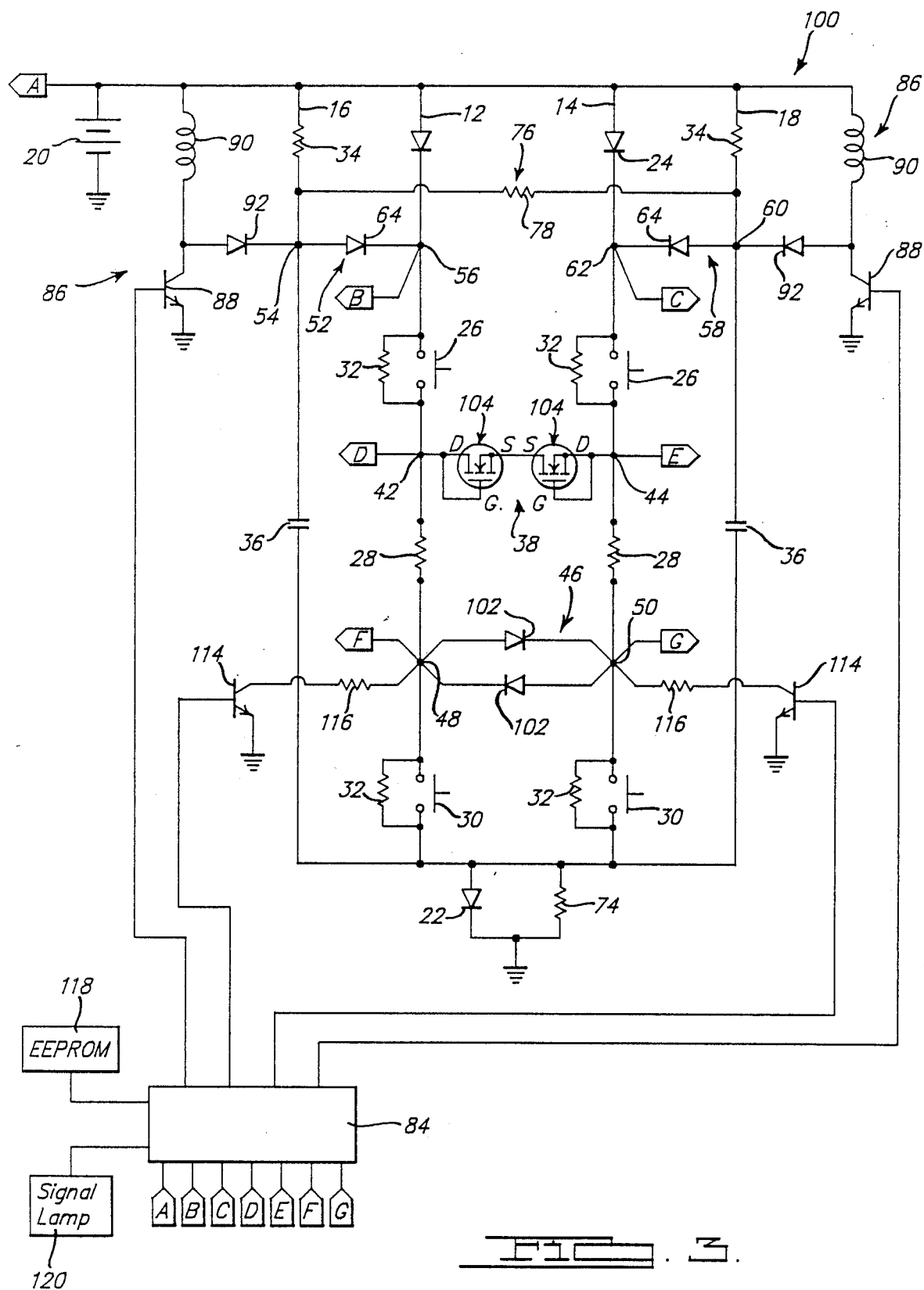
FIG. 3 is a diagrammatic schematic of a third embodiment of an air bag firing circuit featuring multiple firing paths, full circuit diagnosability, and continued viability notwithstanding the presence of one or more faults therein.
Figure 4:
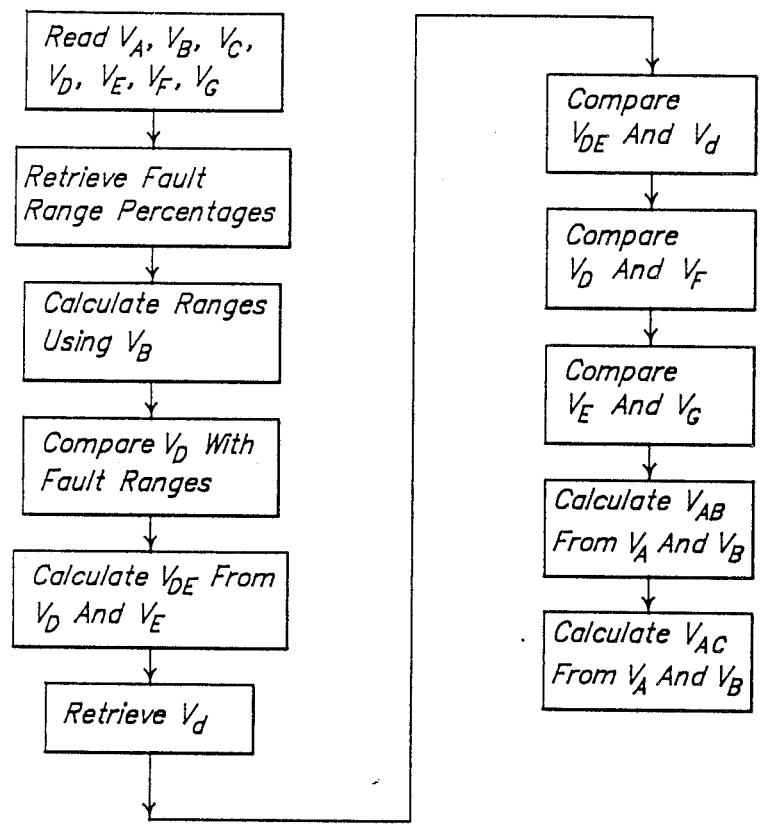
FIG. 4 is a flow chart illustrating a method for diagnosing the presence of one or more faults in the air bag firing circuit of FIG. 3, as executed by the microprocessor thereof.

In addition to the circuit elements heretofore described with respect to the first two embodiments 10 and 70 illustrated in FIGS. 1 and 2, the third embodiment 100 illustrated in FIG. 3 further comprises a pair of oppositely-biased diodes 102 on each of the first and second bridges 38 and 46, respectively With regard to the addition of the diodes to the first bridge 38, it is initially noted that the current-limiting resistor 40 of the first and second embodiments 10 and 70 has been replaced by a pair of n-channel MOSFETs 104 connected in series so as to place their sources in opposition and having their gates tied to their respective drains. And, since the junction of a MOSFET itself constitutes a low-power diode, where the use of the MOSFETs 104 inherently provide the oppositely-biased diodes required for circuit diagnostics, and no additional diodes are required on that bridge 38.

FIG. 6 is a schematic view in isolation of an alternate configuration for the first bridge 38 of the third embodiment 100 extending between junctions 42 and 44 thereof. Specifically, the bridge 38 comprises two circuit branches 106 and 108 connected in parallel, with each of the branches 106 and 108 comprising a resistor 110 of similar nominal resistance and a diode 112. The cathode of the diode 112 of one of the circuit branches 106 faces the first circuit leg 12, and the cathode of the diode 112 of the other of the circuit branches 108 faces the second circuit leg 14.

The third embodiment 100 also comprises and means for determining the instantaneous forward-biased conduction voltages of the bridge diodes, such as a pair of transistors 114 individually operative under microprocessor control to draw current from the second junctions 48 and 50 on the first and second circuit legs 12 and 14, respectively, via a resistor 116. The microprocessor 84 then calculates the resultant voltage drop across each bridge, whereby the firing circuit periodically redetermines the forward-biased conduction voltage $V_d$ of the bridge diodes of the firing circuit 100 so as to account for original manufacturing tolerances as well as the effects of time and temperature thereon. It is noted that a second charge pump 86 has also been added to the firing circuit 100 illustrated in FIG. 3 in order to provide an extra measure of redundancy and, hence, increased circuit viability.

The bridges 38, 46, 52, 58, and 76 of the third embodiment 100 perform all of the functions previously described with respect to the first two embodiments. Moreover, in the third embodiment 100, the first and second bridges 38 and 46 thereof additionally permit the diagnosing of the presence of one or more firing circuit "faults" in situ, as well as facilitating the identification of the faults.

Specifically, in order to diagnose faults therein, the microprocessor 84 of the third embodiment 100 is provided with seven analog-to-digital converter ports "A", "B", "C", "D", "E", "F", and "G" for reading the voltages at the battery 20 and junctions 56, 62, 42, 44, 48, and 50 about the circuit 100, respectively. As in the second embodiment the voltage $V_B$ detected at junction 56 of the first circuit leg 12 is used as a reference voltage in the manner described hereinbelow. In this regard, it is noted that the voltage $V_C$ detected at junction 62 of the second circuit leg 14 may alternatively be used as the reference voltage in the diagnostic sequence described hereinbelow. The microprocessor 84 further calculates a seven voltage ranges from the reference voltage $V_B$ using a like number of known fault range percentages; identifies the applicable voltage range using the voltage $V_D$ detected at junction 42; compares the voltages detected at two or more junctions with each first two bridges 38 and 46 with the forward-biased conduction voltages of the diodes 104 and 102 thereof; and, if the identity of the fault has not yet been determined, examining the voltage drops $V_{AB}$ and $V_{AC}$ between the battery 20 and junction 56, and the battery and junction 62, respectively.

The firing circuit 100 further comprises a non-volatile memory unit such as an EEPROM 118 connected with the microprocessor 84 for storing a plurality of reference values useful in diagnosing the presence of faults, and wherein the frequency and identity of such diagnosed faults are recorded for subsequent review; and signal means, such as signal lamp 120, actuated by the microprocessor 84, whereby the presence of a fault is indicated to the vehicle operator It is noted that where the instantaneous voltage drop across any diode bridge 38 and 46 exceeds the forward-biased conduction voltage $V_d$ of the diodes 104 and 102 thereof, the forwardly-biased diode of the bridge 38 and 46 "turns on", i.e., a current will begin to flow therethrough, whereafter the voltage drop across the bridge 38 and 46 is limited to the diode forward-biased conduction voltage $V_d$. Where the voltage across the bridge 38 and 46 exceeds the forward-biased conduction voltage $V_d$ of the diodes 104 and 102 thereof, a diode fault is indicated, as discussed hereinbelow.

The diagnostic sequence executed by the microprocessor 84 is shown schematically in FIG Z Specifically, the microprocessor 84 diagnoses the presence, if any, of a fault in the firing circuit 100 by: (1) reading the voltages $V_A$, $V_B$, $V_C$, $V_D$, $V_E$, $V_F$, and $V_G$; (2) retrieving from the EEPROM 118 the range percentages previously recorded therein which define various groupings of possible circuit faults using reference voltage $V_B$; (3) calculating five voltage ranges using the above percentages and $V_B$; and (4) determining the presence and identity of any specific fault based on: (a) the fault range in which voltage $V_D$ lies; (b) the voltage drop $V_{DE}$ between junctions 42 and 44 in comparison with a reference diode forward-biased conduction voltage $V_d$ retrieved from the EEPROM 118; (c) the voltage drops between junctions 42 and 48, and junctions 44 and 50, respectively; and (d) the voltage drops $V_{AB}$ and $V_{AC}$ between the battery 20 and junctions 56 and 62, respectively. If a fault is indicated, the microprocessor 84 thereafter records the indicated fault in the EEPROM 118 and empowers the signal lamp 120. It is noted that the fault range percentages may be alternately imbedded in the set of instructions to be executed by the microprocessor 84, whereby reference need no longer be made to the EEPROM 118 to obtain such values.

The fault range percentages retrieved from the EEPROM 118 in step (2) above are initially determined by circuit analysis in a manner known to those skilled in the art, whereby the likely change in voltages at the junctions 42, 44, 48, 50, 56 and 62, respectively, in response to each possible fault is calculated. The percentages thus obtained are then empirically broadened to provide fault voltage ranges which accommodate allowable variations in the electrical characteristics of the elements comprising the firing circuit 100. Thus, for an exemplary embodiment of the instant firing circuit 100 having 2k shunting resistors 32, Range 1 lies between ground and 16.5% of reference voltage $V_B$; Range 2 between 16.5% and 46% of $V_B$; Range 3 between 46% and 58% of $V_B$; Range 4 between 58% and 79% of $V_B$; and Range 5 between 79% and 100% of $V_B$. Indeed, the above percentages hold true for any embodiment in which the shunting resistors 32 are of like nominal resistance and the nominal internal resistance of the squibs 28 is negligible when compared therewith.

The observed voltage drops $V_{DE}$, $V_{DF}$, and $V_{EG}$ developed between junctions 42 and 44, junctions 42 and 48, and junctions 44 and 50, respectively, are used in combination with the above fault ranges to identify twenty-six specific faults, or to confirm the absence of faults in the circuit 10, as indicated in the following Table:

TABLE I

| | Fault No. | Fault Description | $V_{DE}$ | $V_{DF}$ | $V_{EG}$ | $V_{AB}$ | $V_{AC}$ |
|---|---|---|---|---|---|---|---|
| Range 5 | 1. | J3 short to $V_B$ | $+V_d$ | — | | 0 | |
| | 2. | SS1 closed. | $+V_d$ | + | | + | |
| | 3. | J1 short to $V_B$ | $+V_d$ | + | | 0 | |
| | 4. | J4 short to $V_B$ | $-V_d$ | | — | | 0 |
| | 5. | SS2 closed. | $-V_d$ | | + | | + |
| | 6. | J2 short to $V_B$ | $-V_d$ | | + | | 0 |
| | 7. | Squibs 1 & 2 open | nil | $+V_B$ | | + | + |
| | 8. | SS1&2 closed | nil | + | | + | + |
| | 9. | J1&2 short to $V_B$ | nil | + | | 0 | 0 |
| | 10. | Open between J3&4 and gnd. | nil | 0 | | + | + |
| | 11. | J3&4 short to $V_B$ | nil | 0 | | 0 | 0 |
| Range 4 | 12. | Open between J3 and gnd. | $+V_d$ | | | | |
| | 13. | Open between J4 and gnd. | $-V_d$ | | | | |
| | 14. | Measurement error | $-V_d < V_{DE} < +V_d$ | | | | |
| Range 3 | 15. | Squib 1 open | $+V_d$ | | | | |
| | 16. | Squib 2 open | $-V_d$ | | | | |
| | 17. | Resistor out of range | $-V_d < V_{DE} < -g$, or $+g < V_{DE} < +V_d$ | | | | |

TABLE I-continued

| | | No fault present | nil | |
|---|---|---|---|---|
| Range 2 | 18. | Open between J1 and $V_B$ | $+V_d$ | |
| | 19. | Open between J3 and $V_B$ | $-V_d$ | |
| | 20. | Measurement error | $-V_d < V_{DE} < +V_d$ | |
| Range 1 | 21. | CS2 closed, or J4 short to gnd. | $+V_d$ | + |
| | 22. | J1 short to gnd. | $+V_d$ | 0 |
| | 23. | CS1 closed, or J2 short to gnd. | $-V_d$ | + |
| | 24. | J2 short to gnd. | $-V_d$ | 0 |
| | 25. | CS1&2 closed, or J3&4 short to gnd. | nil | + |
| | 26. | J1&2 short to gnd. or open between J1&2 and $V_B$ | nil | 0 |

Wherein:
$V_{DE}$ - Voltage detected at junction 42 minus the voltage detected at junction 44
$V_{DF}$ - Voltage detected at junction 42 minus the voltage detected at junction 48
$V_{EG}$ - Voltage detected at junction 44 minus the voltage detected at junction 50
$V_{AB}$ - Voltage detected at the battery 20 minus the voltage detected at junction 42
$V_{AC}$ - Voltage detected at the battery 20 minus the voltage detected at junction 44
SS1 - Safing sensor 26 of first circuit leg 12
SS2 - Safing sensor 26 of second circuit leg 14
CS1 - Crash sensor 30 of first circuit leg 12
CS2 - Crash sensor 30 of second circuit leg 14
J1-J4 - First through fourth junctions 42, 44, 48, and 50, respectfully
"$V_d$" - The instantaneous forward-biased conduction voltage of diodes 102 and 104 constituting bridges 46 and 38, respectively
"+" - An appreciable positive voltage
"−" - An appreciable negative voltage
"nil" - A voltage of negligible amplitude
"g" - A specified guard band, for example, 0.3 volts, to accommodate variation in the nominal resistance of circuit components and, thus, prevent inadvertent registering of faults when the circuit is fault free The following examples serve to illustrate application of the above diagnostic sequence, as swell as illustrating the use of Table I. For each example, the reference voltage $V_B$ is 12 volts and, thus, the Ranges 1-5 as calculated under step (2) above are as follows: Range 1, 0.0 to 1.98 volts; Range 2, 1.98 to 4.86 volts; Range 3, 4.86 to 6.88 volts; Range 4, 6.88 to 9.42 volts; and Range 5, 9.42 to 12.0 volts. It is assumed, for the following examples, that the diode forward-biased conduction voltage $V_d$ has been found to be 0.70 volts.

EXAMPLE 1

The voltages $V_D$, $V_E$, $V_F$, and $V_G$ at "first", "second", "third", and "fourth" junctions 42, 44, 48, and 50 are determined to be 12.00, 12.00, 11.98, and 11.99 volts, respectively. The applicable range is thus Range 5, as the voltage $V_D$ at the first junction 42 is 12.00 volts. Since the voltage drop $V_{DE}$ between the first and second junctions 42 and 44 is zero, initial reference to Table I using only $V_{DE}$ identifies the following possible fault conditions: both squibs 28 are open (fault no. 7); both safing sensors 26 are closed (fault no. 8); the first and second junctions 42 and 44 are both shorted to the positive terminal of the battery 20 (fault no. 9); the circuit legs 12 and 14 are open between the third junction 48 and ground, and between the fourth junction 50 and ground, respectively, (fault no. 10): or both the third and the fourth junctions 48 and 50 of the firing circuit 100 are shorted to the positive terminal of the battery 20 (fault no. 11).

Further identification of the fault requires examination of the voltage drop $V_{DF}$ between the first and third junctions 42 and 48. In the instant example, a small positive voltage drop $V_{DF}$ of 0.02 volts occurs between the first and third junctions 42 and 48, and thus fault nos. 7, 10, and 11 do not apply—fault no 7 would have generated a voltage drop $V_{DF}$ therebetween equivalent to voltage $V_B$ (i.e., 12 volts), and fault nos. 10 and 11 would both have generated like voltages at the junctions 42 and 48.

To further differentiate between fault nos. 8 and 9, the voltage drops $V_{AB}$ and $V_{AC}$ between the battery and junction 56, and the battery and junction 62, respectively, must be examined Where both $V_{AB}$ and $V_{AC}$ are appreciable positive voltage drops, Table I indicates that both safing sensors 26 are closed (fault no. 8). If there is no voltage drop between $V_A$ and $V_B$, and $V_A$ and $V_C$, respectively, and thus $V_{AB}$ and $V_{AC}$ are zero, then the first and second junctions 42 and 44 are shorted to the battery 20 (fault no 8).

It is noted that, where the voltage drops $V_{DF}$ and $V_{EG}$ are unavailable, as where the voltages at only the first and second junctions 42 and 44 are read by the microprocessor 84, the specific fault in this example cannot be identified. Rather, the fault may only be characterized as being within two groups of faults, namely, either in the group comprising fault nos. 7, 8, and 10, or in the group comprising fault nos. 9 and 11.

EXAMPLE 2

The voltages at the first, second, third and fourth junctions 42, 44, 48 and 50 are determined to be 11.98, 12.00, 11.28, and 11.30 volts respectively. The first junction voltage $V_D$ thus falls within Range 5. Initial reference to Table I using $V_{DE}$ indicates the following possible fault conditions: the first junction 42 is shorted to the positive terminal of the battery 20 (fault no. 1); the safing sensor 26 on circuit leg 12 is closed (fault no. 2); or the third junction 48 is shorted to the positive terminal of the battery 20 (fault no. 3). Further reference to Table I using the small negative voltage drop $V_{DF}$ present between the first and third junctions 42 and 48 indicates that junction 42 is shorted to the positive terminal of the battery 20 (fault no. 1).

EXAMPLE 3

The voltages at the first, second, third and fourth junctions 42, 44, 48, and 50 are determined to be 6.10, 6.10, 6.06, and 6.07, respectively. The first junction voltage $V_D$ thus falls within Range 3. Since the first and second junctions 42 and 44 are of equal voltage, there is no fault present within the circuit 100.

EXAMPLE 4

The voltages of the first, second, third and fourth junctions 42, 44, 48 and 50 are determined to be 5.97, 6.12, 5.93, and 6.10 volts respectively. The first junction voltage $V_D$ thus falls within Range 3. In as much as voltage drop $V_{DE}$ of −0.15 volts between the first and second junctions 42 and 44 is significantly less than the diode forward-biased conduction voltage $V_d$, at least one of the shunting resistors 32 in the circuit 100 has a nominal resistance outside of the acceptable range therefor (fault no. 17).

It is noted that the diode 22 connected between the four parallel circuit legs 12, 14, 16, and 18 and ground permits further differentiation between the alternate conditions of fault nos. 21, 23, and 25. Specifically, the second and fourth junctions 44 and 50 are not shorted to ground where the voltages thereof are equal to the forward-biased conduction voltage $V_d$ of such additional resistors In contrast, a short to ground is indicated where the voltages of the second and fourth junctions 44 and 50 are zero.

The forward-biased conduction voltage $V_d$ of a given diode varies both as a result of manufacturing tolerances and the operating conditions to which the diode is exposed, e.g., variations in the operating temperature thereof. Thus, in order to accurately diagnose a fault within the firing circuit 100, the instantaneous forward-biased conduction voltage $V_d$ of each diode 104 and 102 in bridges 38 and 46 is periodically redetermined for use in the above diagnostic sequence Accordingly, the firing circuit 100 further comprises transistors 114 connected to junctions 48 and 50, respectively, for selectively drawing current from the first and second circuit legs 12 and 14 Specifically, the collector of each transistor 114 is connected to either junction 48 and 50 via a resistor 116 of similar resistance as the shunting resistors 32, with the emitter of each transistor 114 being connected to ground.

Figure 5:
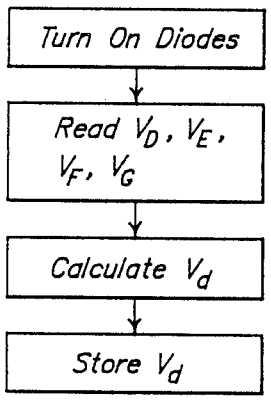
FIG. 5 is a flow chart illustrating a method for determining the instantaneous forward-biased conduction voltages of the bridge diodes of the air bag firing circuit of FIG. 3.

The method for determining the instantaneous forward-biased conduction voltages $V_d$ of the diodes 104 and 102 comprising the bridges 38 and 46 is illustrated in FIG. 5. Specifically, the microprocessor 84 supplies a current to the base of one of the transistors 114. An increased current thus flows through the circuit leg 12 or 14 to which the empowered transistor 114 is connected which, in turn, results in a larger voltage drop across the safing sensor 26 thereof to provide a voltage drop across the forwardly-biased diodes of each bridge 38 and 46 sufficient to turn the diodes "on". The resultant voltage drops $V_{DF}$ and $V_{EG}$ between junctions 42 and 44, and junctions 48 and 50, respectively, equal the instantaneous values of the forward-biased conduction voltages of the diodes 104 and 102. The above method is repeated with the transistor 114 drawing current from the other circuit leg 12 or 14, whereby the instantaneous forward-biased conduction voltage $V_d$ of each of the oppositely-biased diodes 104 and 102 of the bridges 38 and 46 are calculated. The instantaneous forward-biased conduction voltage $V_d$ of each diode 104 and 102 is thereafter stored in the EEPROM 118 for use in the diagnostic sequence described hereinabove.

It is noted that a preselected value for the diode forward-biased conduction voltages $V_d$ is used if the instantaneous voltage drop across the diode cannot be calculated due to transistor or diode malfunction. In this regard, it is further noted that the diode forward-biased conduction voltages $V_d$ can be accurately checked only when there are no faults present in the firing circuit 100, or when the faults present fall within Range 3, as defined hereinabove. Thus, when testing for the instantaneous diode forward-biased conduction voltage $V_d$, if the voltage drop $V_{DE}$ is greater than zero but less than a minimum allowable value therefor, a transistor or diode fault is indicated (fault no. 18).

The instant diagnostic sequence may additionally comprise the steps of: reading the voltages about the firing circuit several times and calculating average values therefrom for use the steps outlined hereinabove; checking the integrity of the signal lamp 120 and empowering a back-up signal means in the event of a failure of the signal lamp 120; signaling the specific fault detected, as by a coded sequence via the signal lamp 120; reading the battery voltage $V_A$ and charging capacitors 36 with charge pumps 86 if the reference voltage $V_B$ falls below the level sufficient to fire both squibs 28, as may occur, for example, upon malfunction of the battery 20 or the isolation of the battery 20 from the circuit 100 during a vehicle collision; and verifying the physical attachment of the sensors 26 and 30 to the vehicle frame through the use of additional sensing means therefor (not shown).

Upon the determination of the presence of a fault within the circuit 100, the microprocessor 84 may incorporate means therein, such as incremental counters, for determining whether the indicated fault is a system aberration, such as a momentary closure of one of the safing sensors 26, or a true fault, such as a sensor which has failed in the closed position. The microprocessor 84 may further incorporate a deadman timer to ensure continued diagnostic capability therein, e.g., to cause the microprocessor 84 to begin at a specific point in the instructions therefor in the event that the microprocessor 84 is tied up by a random external disturbance. The microprocessor 84 instructions may further comprise steps for checking the integrity of the EEPROM 118 connected therewith, and for recording in the EEPROM 118 the purging of the faults recorded therein.

While the preferred embodiments of the invention have been disclosed, it should be appreciated that the invention is susceptible of modification without departing from the scope of the following claims. For example, it will be readily appreciated that the circuit "upgrades" from the first to the third embodiments of the instant firing circuit described herein may be used in a variety of combinations to maximize circuit performance with minimal cost. For example, the utilization of a nominal value for the forward-biased conduction voltage of the various diodes located about the circuit will permit the elimination of the transistors operative to draw current from the second junctions on the first and second circuit legs, respectively, while maintaining a high level of circuit diagnosability.

We claim:

1. A firing circuit for actuating a first and second vehicle passenger restraint comprising
   four parallel circuit legs connected across a battery via a first diode placed in series therewith, the cathode of said first diode being grounded to said battery;
   said first and second circuit legs each including in series
   a diode
   a normally-open safing sensor connected to the cathode of the diode of said circuit leg,
   a trigger means having an internal resistance for deploying one of said restraints, and
   a normally-open crash sensor,
   the safing sensors and crash sensors of each of said first and second circuit legs being shunted by resistors having a nominal resistance substantially greater than the internal resistance of said trigger means;
   said third and fourth circuit legs each comprising in series;

a current-limiting device from the group consisting of resistors and diodes, and a capacitor;

a first bridge connecting said first circuit leg with said second circuit leg between the diodes and the safing sensors thereof, respectively, said first bridge including a current-limiting device;

a second bridge connecting said first circuit leg with said second circuit leg between the trigger means and the crash sensors thereof, respectively;

a third bridge connecting said third circuit leg between the current-limiting device and the capacitor thereof with said first circuit leg between the diode and the safing sensor thereof, said third bridge including a diode, the cathode of the diode of said third bridge facing said first circuit leg; and a fourth bridge connecting said fourth circuit leg between the current-limiting device and the capacitor thereof with said first circuit leg between the diode and the safing sensor thereof, said fourth bridge including a diode, the cathode of the diode of said fourth bridge facing said second circuit leg.

2. The firing circuit of claim 1 wherein the current-limiting devices of said third and fourth circuit legs comprise resistors.

3. The firing circuit of claim 1 wherein the current-limiting devices of said third and fourth circuit legs comprise diodes.

4. The firing circuit of claim 1 wherein the current-limiting device of said first bridge comprises a resistor.

5. The firing circuit of claim 1 wherein the current-limiting device of said first bridge comprises a first and second n-channel MOSFET, said MOSFETs being connected in series so as to place the sources thereof in opposition, the gates of said MOSFETs being tied to the drains thereof, respectively.

6. The firing circuit of claim 1 including a resistor shunting said first diode;

a fifth bridge connecting said third circuit leg with said fourth circuit leg between the current-limiting devices and the capacitors thereof, respectively, said fifth bridge including a resistor; and a charge pump operative to deliver charges to the capacitor of either said third or fourth circuit legs.

7. The firing circuit of claim 6 wherein said charge pump includes a transistor, the collector of said transistor being connected via a diode to said third or fourth circuit leg between the current-limiting means and the capacitor thereof, the cathode of the diode of said charge pump facing said third or fourth circuit leg, the emitter of said transmitter being grounded to said battery; and an inductor connecting the positive terminal of said battery with the collector of said transistor.

8. The firing circuit of claim 1 wherein each of said first and second bridges further include a pair of oppositely-biased diodes.

9. The firing circuit of claim 8 including means for determining the instantaneous forward-biased conduction voltages of the diodes of said first and second bridges, respectively.

10. The firing circuit of claim 9 wherein said means for determining the instantaneous forward-biased conduction voltages of the diodes of said first and second bridges, respectively, include means operative to draw current from a bridge-circuit leg junction about said firing circuit; and means for calculating the resultant voltage drop across each bridge.

11. The firing circuit of claim 8 including means for detecting the voltage at a plurality of bridge-circuit leg junctions about said firing circuit;

means for calculating a plurality of voltage ranges from one of said detected junction voltages using a like number of known range percentages;

means for comparing one of said detected junction voltages with said calculated voltage ranges;

means for comparing two or more of said detected junction voltages with each other; and means for comparing the voltage drop across each of said first and second bridges with the forward-biased conduction voltages of the diodes thereof.

12. In a firing circuit for actuating a first and second vehicle passenger restraint comprising a first circuit leg including in series a first normally-open safing sensor, a first trigger means having an internal resistance for actuating said first restraint, and a first normally-open crash sensor, said first safing sensor and said first crash sensor each being shunted by a first and second resistor, respectively, said first and second shunting resistors having a resistance substantially greater than the internal resistance of said first trigger means;

a second circuit leg connected in parallel with said first circuit leg comprising in series a second normally-open safing sensor, a second trigger means for actuating said second restraint having an internal resistance substantially equal to the internal resistance of said first trigger means, and a second normally-open crash sensor, said second safing sensor and second crash sensor each being shunted by a third and fourth resistor, respectively, said third and fourth shunting resistors having a resistance substantially greater than the internal resistance of said second trigger means;

a first bridge comprising first and second oppositely-biased diodes connecting a first junction on said first circuit leg between said first safing sensor and said first trigger means with a first junction on said second circuit leg between said second safing sensor and said second trigger means;

a second bridge comprising third and fourth oppositely-biased diodes connecting a second junction on said first circuit leg between said first trigger means and said first crash sensor with a second junction on said second circuit leg between said second trigger means and said second crash sensor; and means for applying a voltage across said parallel circuit legs;

the improvement wherein said first circuit leg further includes a fifth diode connected in series with said first safing sensor, the cathode of said fifth diode facing said first safing sensor;

said second circuit leg further includes a sixth diode connected in series with said second safing sensor, the cathode of said sixth diode facing said second safing sensor;

said first bridge further includes a first current-limiting means for limiting the current permitted to flow in either direction therethrough; and said means for applying a voltage across said parallel circuit legs includes a battery; and a seventh diode connected in series with said parallel circuit legs, the cathode of said fifth diode being connected to ground;

and including a third circuit leg in parallel with said first and second circuit legs including a second current-limiting device from the group consisting of resistors and a diodes, and a first capacitor connected in series with said second current-limiting device;

a fourth circuit leg in parallel with said first, second and third circuit legs including a third current-limiting device from the group consisting of resistors and diodes, and a second capacitor connected in series with said third current-limiting device;

a third bridge connecting a first junction on said third circuit leg between said second current-limiting device and said first capacitor with a third junction on said first circuit leg between said fifth diode and said first safing sensor, said third bridge including an eighth diode, the cathode of said eighth diode facing said third junction on said first circuit leg;

a fourth bridge connecting a first junction on said fourth circuit leg between said third current-limiting device and said second capacitor with a third junction on said second circuit leg between said sixth diode and said second sating sensor, said fourth bridge including a ninth diode, the cathode of said ninth diode facing said third junction on said second circuit leg.

13. The firing circuit of claim 12 wherein said first and second diodes, and said first current-limiting means, of said first bridge comprise a first and second n-channel MOSFET, said MOSFETs being connected in series so as to place the sources thereof in opposition, the gates of said MOSFETs being tied to the drains thereof, respectively.

14. The firing circuit of claim 12 including a fifth bridge connecting a second junction on said third circuit leg between said second current-limiting device and said first capacitor with a second junction on said fourth circuit leg between said third current-limiting device and said second capacitor;

charge pump means for delivering charge to said first or second capacitor; and a fifth resistor shunting said seventh diode.

15. The firing circuit of claim 14 wherein said second and third current-limiting devices comprise a sixth and seventh resistor, respectively.

16. The firing circuit of claim 15 wherein said sixth and seventh resistors have resistances significantly greater than the resistance of said fifth resistor, respectively.

17. The firing circuit of claim 12 wherein said second and third current-limiting devices comprise a tenth and eleventh diode, respectively.

18. The firing circuit of claim 14 wherein said charge pump includes a transistor, the collector of said transistor being connected via a diode to said first junction of said third or fourth circuit leg, the cathode of the diode of said charge pump facing said third or fourth circuit leg, the emitter of said transmitter being grounded to said battery; and an inductor connecting the positive terminal of said battery with the collector of said transistor.

19. The firing circuit of claim 18 including means for determining the instantaneous forward-biased conduction voltages of said first, second, third, and fourth diodes.

20. The firing circuit of claim 19 wherein said means for determining the instantaneous forward-biased conduction voltages of said first, second, third, and fourth diodes includes means operative to draw current from said second junction of either said first or second circuit leg; and means for calculating the resultant voltage drop across each bridge.

21. The firing circuit of claim 18 including means for detecting the voltage at a plurality of junctions about said firing circuit;

means for calculating a plurality of voltage ranges from one of said detected junction voltages using a like number of known range percentages;

means for comparing one of said detected junction voltages with said calculated voltage ranges;

means for comparing two or more of said detected junction voltages with each other; and means for comparing the voltage drop across each of said first and second bridges with the forward-biased conduction voltages of said first, second, third, and fourth diodes.

* * * * *

UNITED STATES PATENT AND TRADEMARK OFFICE
CERTIFICATE OF CORRECTION

PATENT NO. : 4,987,316

DATED : JANUARY 22, 1991

INVENTOR(S) : CRAIG W. WHITE and KEVIN E. MUSSER

It is certified that error appears in the above-identified patent and that said Letters Patent is hereby corrected as shown below:

```
Col.  7, line 35, after "each" insert --other; compares the
        voltage drop V_d across each of the--
Col.  7, line 49, after "operator" insert a period(.)
Col.  7, line 49, after "that" insert a comma(,)
Col.  7, line 62, "FIG Z" should be --FIG 2.--
Col.  9, line 45, "swell" should be --well--
Col. 10, line 19, after "examined" insert a period(.)
Col. 14, line 2, "include" should be --includes--
Col. 15, line 8, "fifth" should be --seventh--
Col. 15, line 33, "sating" should be --safing--
```

Signed and Sealed this

Twenty-sixth Day of May, 1992

Attest:

DOUGLAS B. COMER

Attesting Officer

Acting Commissioner of Patents and Trademarks